March 6, 1956
C. S. SEMAR
2,737,229
SEAT CONSTRUCTION
Filed Nov. 18, 1952
2 Sheets-Sheet 1
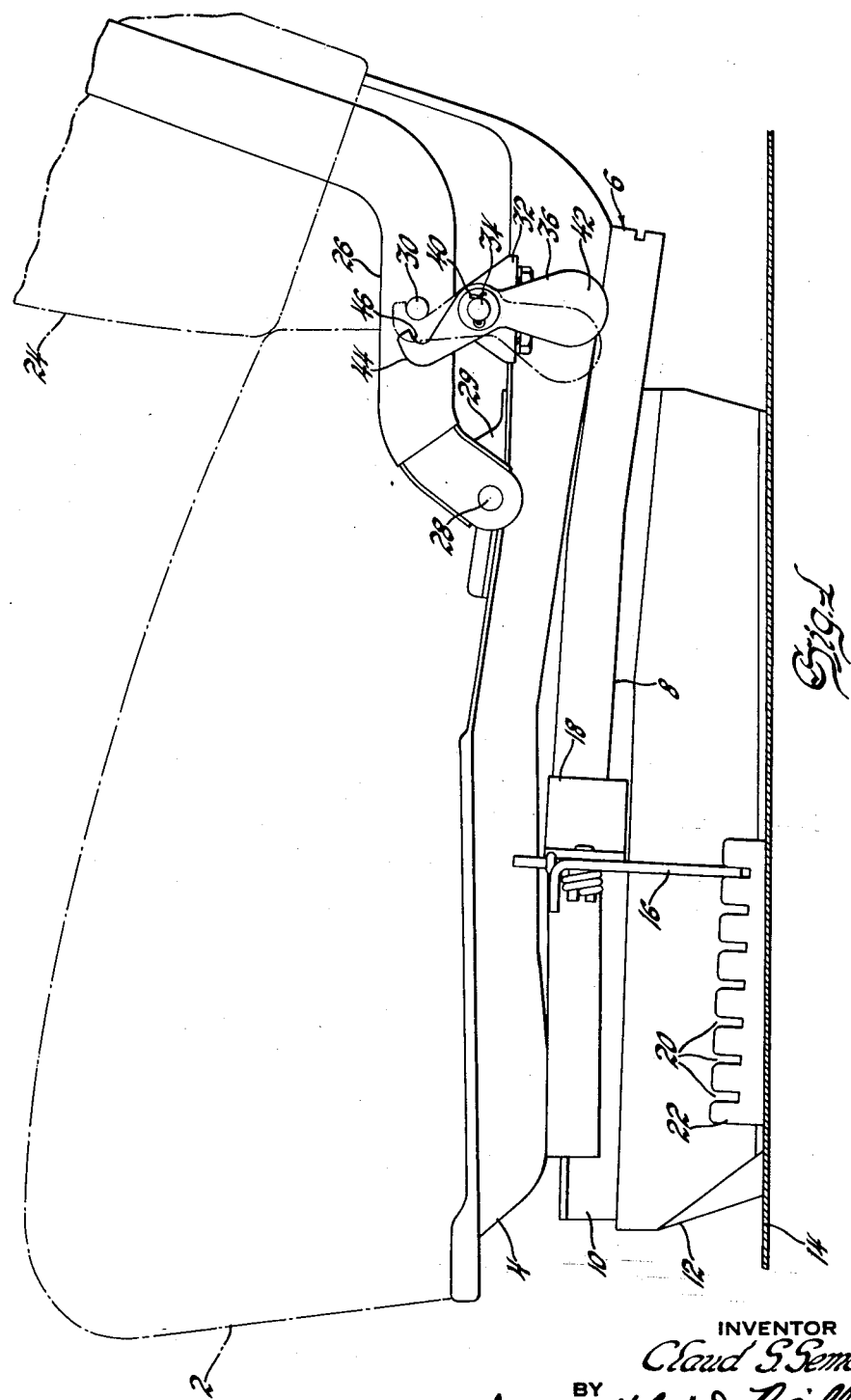
INVENTOR
Claud S Semar
BY
Willito, Helwig & Baillio
ATTORNEYS March 6, 1956 C. S. SEMAR 2,737,229
SEAT CONSTRUCTION
Filed Nov. 18, 1952 2 Sheets-Sheet 2
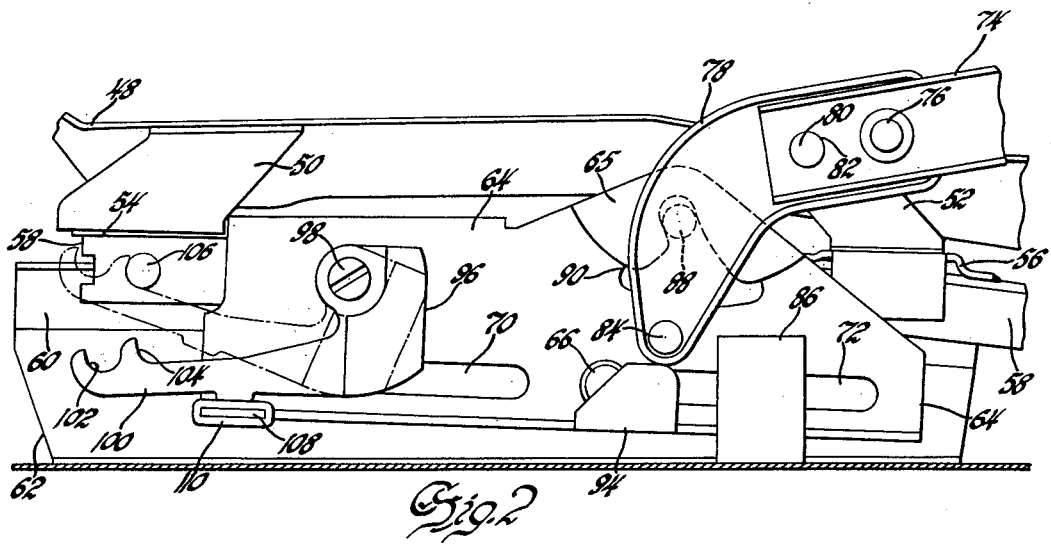
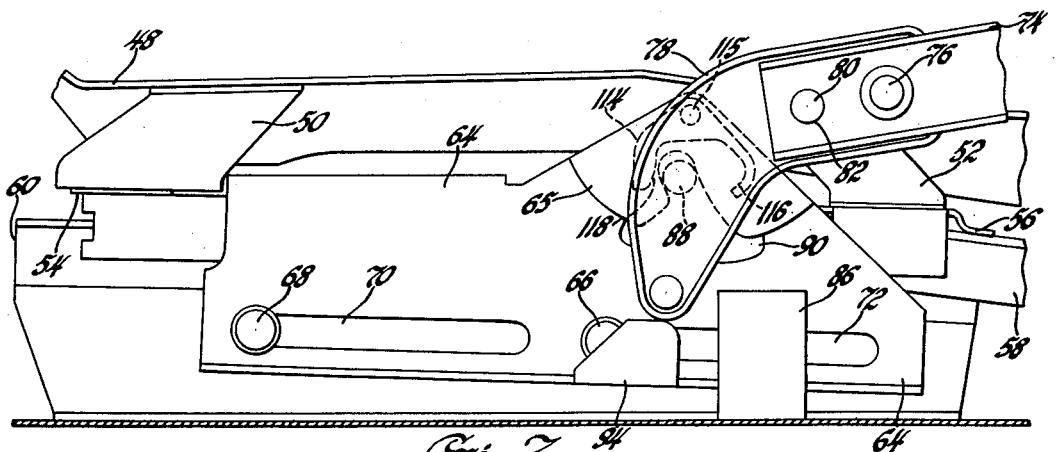
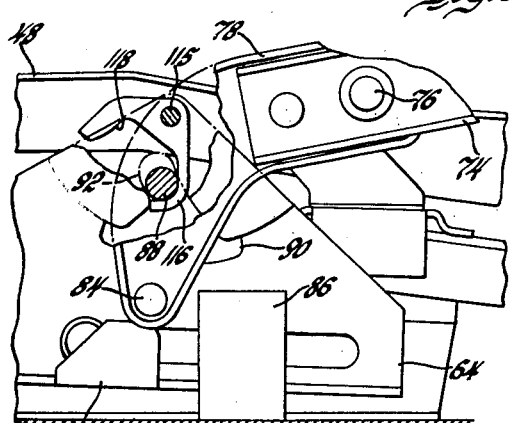
Inventor
Claud S. Semar
By Willits, Helmig & Baillio
Attorneys

United States Patent Office 2,737,229
Patented Mar. 6, 1956

2,737,229

SEAT CONSTRUCTION

Claud S. Semar, Birmingham, Mich., assignor to General Motors Corporation, Detroit, Mich., a corporation of Delaware Application November 18, 1952, Serial No. 321,170

9 Claims. (Cl. 155—14)

This invention relates to vehicle seats and more particularly to latching mechanisms for seats having tiltable split backs.

Since the two-door vehicle comprises a very large proportion of passenger-car production, seats having tiltable split backs are very common. Because of the hinged mounting employed on seat backs of this type, the backs have a tendency to jack-knife or swing forwardly over the cushion when the vehicle is decelerated rapidly. This tendency is annoying when the vehicle is occupied by the operator only, and highly dangerous when passengers are occupying the rear seats. Sudden deceleration of a vehicle acts upon the passengers in the same manner as upon the seat back, therefore, rear seat passengers may be thrown forward against the seat back positioned behind the driver. Since the inertia of an adult passenger is sufficient to force the driver forward against the steering wheel, it is desirable that means be provided to prevent pivotal movement of the seat back except as required for entrance and exit of the rear seat passengers when the vehicle is stationary. While manually operated latching devices adapted to secure the seat back rigidly in position have been employed, it has been found that certain disadvantages result from such construction. If, for example, the vehicle were involved in a serious accident, the necessity of locating and operating the manual latch in order to remove the rear seat passengers presents a serious problem.

It is therefore an object of this invention to provide latching means adapted to prevent tilting movement of the pivotally mounted seat backs resulting from sudden deceleration, wherein the latch is operatively engaged only during the period of deceleration.

Another object is to provide a mechanism operable upon deceleration to render a tilting seat back highly resistant to substantial impact.

Still another object of the invention is to provide a device of the type described which is adapted for incorporation in a vehicle seat of the type wherein tilting movement of the seat back is accompanied by swinging or linear movement of the seat proper.

These and other objects of the invention will become more fully apparent as reference is had to the accompanying drawings wherein:

Fig. 1 is a side elevational view of a portion of a conventional two-door vehicle front seat having pivotally mounted forwardly tiltable split-backs, showing the position of the latching mechanism when the vehicle is stationary and, in dotted lines, the position of the latching mechanism, when the vehicle is decelerated.

Fig. 2 is a fragmentary side elevational view showing one side of a seat mechanism adapted to provide simultaneous tilting movement of the seat back and forward traversing of the seat cushion, the modified latching mechanism being shown in the latched and the unlatched position.

Fig. 3 is a side elevational view of a seat structure similar to Fig. 2 showing another modification of the latching mechanism wherein the latch is engageable directly upon the seat back arm.

Fig. 4 is a fragmentary side elevational view, with parts broken away, showing the structure of Fig. 3 with the latch mechanism in the operative position engaging the lower portion of the seat back arm.

Referring now to the drawings and particularly to Fig. 1 there is shown a conventional two-door vehicle front seat 2 which is mounted on a seat frame 4. Seat frame 4 extends transversely substantially across the width of the interior of the vehicle and is secured to parallel spaced apart fore and aft adjuster mechanisms 6. While only one side of the seat is shown it will be understood that the adjuster mechanisms are alike and the description of one side applies to both. Each adjuster mechanism 6 comprises a longitudinally extending upper channel member 8 which is adapted for fore and aft movement along a lower channel member 10 to provide for various positions of adjustment of the seat in keeping with the height of the operator of the vehicle. Lower channel member 10 is secured to a suitable bracket 12 which is in turn mounted on the floor 14 of the vehicle. A fore and aft adjustment adapted to secure the seat releasably in its various longitudinal positions of adjustment is provided by a spring-urged manually operable blade 16 pivotally mounted on a bracket 18 secured to the upper channel 8. Blade 16 is selectively engageable with any of the spaced notches 20 provided in the struckup blade portion 22 of the bracket 12 to provide spaced increments of adjustment for the seat.

At the rear edge of the seat there is pivotally mounted a tiltable seat back cushion 24 which normally extends generally vertically. Cushion 24 is provided with a downwardly and forwardly extending hinge arm 26 which is pivotally secured forwardly of the rear edge of the frame 4 on pivot stud 28 extending outwardly from a bracket 29 secured to the frame, and a similar hinge arm (not shown) at the further side of the cushion 24.

In accordance with this embodiment of the invention the arm portion 26 has secured thereon, a suitable distance rearwardly of the pivot connection 28, a stud 30 which extends outwardly therefrom. Directly below stud 30, seat frame 4 is provided with a rigidly mounted bracket 32 having an outwardly extending pivotal stud 34, upon which is rotatably mounted a vertically extending latch member 36. Latch member 36 is freely swingable fore and aft about the stud 34 and is secured thereon against axial movement by means of a washer 38 and a cotter pin 40. Latch 36 is of elongated formation having a relatively heavy lower portion 42 and a forwardly offset upwardly extending finger portion 44 having a rearwardly facing notch 46 formed in the upper edge thereof. When the vehicle is at rest, the latch member 36 assumes a vertical depending position responsive to the force of gravity, since the lower portion 42 is heavier than the finger portion 44. In this position notch portion 46 is offset forwardly sufficiently to clear the stud 30 and permit tilting of the seat back for entrance to and exit from the rear seat. However, if the vehicle is in motion and the brakes are suddenly applied, rapid deceleration causes a forward swinging of the lower portion 42 due to its inertia and a coincidental rearward movement of finger portion 44. As shown in dotted lines, when the finger 44 swings rearwardly, notch 46 is brought into engagement with the stud 30, thereafter preventing forward tilting of the seat back by virtue of the holding action on hinge arm 26. In practice it has been found that the latching action invariably takes place before the seat back begins its forward tilting. Since the relatively heavy seat back is offset rearwardly relative to its pivotal connections, initial response of the seat back is resisted by its disproportionate weight balance while the latch is weighted only sufficiently to normally maintain it in a vertical position. Therefore, the latching action is effected before the seat back can move sufficiently forward to bring the stud 30 out of a position engageable by the notch 46. In practice it has been found that the latching action not only invariably precedes the initial forward movement of the seat back, but that even under conditions wherein brakes are applied and released at very rapid intervals the reaction time of the latch is so rapid as to preclude the possibility of jack-knifing the seat back.

In Fig. 2 there is shown a modification of the inertia latch which is adapted for use on a seat structure wherein tilting movement of the seat back causes simultaneous forward movement of the seat cushion along the seat track assembly. For a complete disclosure of such a seat mechanism reference may be had to co-pending application of Claud S. Semar and Clyde H. Schamel, entitled Seat Mechanism, Serial No. 321,169, filed November 18, 1952. In the modification, the numeral 48 designates a seat frame adapted to support a bench type cushion, not shown. Secured to the seat frame 48 at the front and rear thereof are U-shaped bracket members 50 and 52 which are pivotally secured to additional bracket members 54 and 56 mounted on the upper channel member 58 at the front and rear thereof. Upper channel member 58 surrounds lower channel member 60 and is longitudinally slidable therealong in the conventional manner. Lower channel member 60 is supported on the floor of the vehicle by means of longitudinally extending seat leg 62. A cam plate 64 is slidably mounted on the outer surface of seat leg 62 by means of studs 66 and 68 (Fig. 3) which are secured to the seat leg 62 and extend outwardly through elongated slots 70 and 72 formed in the cam plate 64. Cam plate 64 is longitudinally movable fore and aft along the seat leg 62 by means of a conventional seat actuator mechanism, not shown. A tilting seat back, not shown, is pivotally mounted on the seat frame 48 near the rear edge thereof by means of two hinge arms, only the nearer one being shown. Arm 74 pivotally engages a pivot shaft 76 extending outwardly from the frame 48. An L-shaped lower arm extension 78 engages hinge arm 74 and is co-axially journaled therewith on the pivot shaft 76. In order to permit the extension 78 to travel in a vertical plane parallel to the cam plate 64 when the seat back is tilted, the hinge arm 74 and lower arm extension 78 are also pivotally connected by a transversely extending stud 80 which is secured to the hinge arm and extends through an aperture 82 in the extension 78. With this arrangement it will be apparent that the lower extension 78 will follow the circular movement of the hinge arm 74 while limited lateral movement is permitted therebetween.

At the extreme lower end of extension 78 there is provided an inwardly projecting stud 84 which is adapted to engage a rigidly mounted struckup projection 86 when the seat hinge arm 74 is swung forwardly. Directly above stud 84, lower extension 78 is provided with a second stud 88 which extends inwardly into a generally triangular cut-out portion 90 formed in the outwardly offset portion 65 of cam plate 64. Cut-out 90 is provided with a forwardly and upwardly inclined recess 92 which is occupied by the stud 88 when the seat back is in the normal position. It will be seen that as the seat back hinge arm 74 is swung forwardly the stud 88 will be carried rearwardly and downwardly by the extension 78 along a path defined by the rear edge of the cut-out 90. As the hinge arm 74 is swung forwardly the stud 84 at the lower extremity of extension 78 engages struck-up projection 86 which thereafter arrests further rearward movement of the stud. Since the stud 84 can thereafter no longer travel rearwardly, any additional swinging movement of the arm 74 will impart forward movement to the seat frame 48. Inasmuch as frame 48 is movable with upper channel member 58 the seat frame and attached cushion will move forwardly with upper channel 58 until the seat back reaches its forward limit of tilting movement. Upon reversal of the tilting movement of seat back the stud 84 swings forwardly with the lower extension 78 and engages a second projection 94 formed on the lower edge of cam plate 64. Upon engagement of the stud 84 with the abutment 94 forward swinging movement of the stud 84 is arrested and continued rearward tilting of the seat back causes the seat frame 48 and upper channel 58 to traverse rearwardly along the lower channel 60 to its original position.

It will be apparent that in a seat structure of this type, wherein forward movement of the seat proper accompanies tilting movement of the seat back, it is especially desirable to provide a latching mechanism adapted to prevent tilting movement of the seat back during periods of rapid deceleration of the vehicle. Since many seats of this type are adapted to swing from either side, it will be seen that even when the vehicle is occupied by the operator only, swinging movement of the seat back opposite the driver will cause forward traversing of the cushion which may force the operator against the steering wheel of the vehicle.

The modification of the invention shown in Fig. 2 is adapted to directly arrest forward motion of the cushion and indirectly to arrest swinging movement of the seat back In this modification, a generally L-shaped latch member 96 is secured for freely swinging pivotal movement about a stud 98 secured to the cam plate 64. At its forward end 100 the L-shaped arm is provided with two struck-up catches 102 and 104 which are adapted to engage an outwardly extending stud 106 secured to the upper channel member 58. L-shaped latch member 96 is weighted to cause the forward extension 100 thereof to extend substantially horizontally when the vehicle is at rest. When the vehicle is rapidly decelerated, as by braking, the force of inertia exceeds the force of gravity and causes the forward extension 100 of the L-shaped arm 96 to swing upwardly to the position shown in dotted lines and place the catch 104 in engagement with the stud 106 to resist any tendency of the seat cushion to move forwardly along the lower channel member 58. Since the seat back is pivoted to the seat frame 48, it is free to tilt forward only sufficiently far to bring stud 84 on the lower extension 78 in contact with the struck-up projection 86 secured to the bracket 62. When the rate of deceleration diminishes sufficiently, the force of gravity overcomes the inertia force on the latch member 96 and the seat settles slightly rearwardly to disengage the catch 104 from the stud 106, thereby allowing the latch member 96 to return to the normally horizontally extending position and again permit normal operation of the seat, previously described. To limit the swinging movement of the latch member 96 and eliminate any noise incident to bouncing, an outwardly projecting tab 108 is formed on the cam plate 64 and provided with a resilient sleeve 110 which acts as a cushion stop for the lower edge of the latch. As previously described, latch member 96 is provided with two catches 102 and 104, either of which may engage stud 106. While catch 104 will normally engage stud 106, should any articles placed on the rear floor of the vehicle prevent either seat back from returning to the normal position, the second notch 102 will engage the stud 106 in the event of sudden deceleration.

In Figs. 3 and 4 there is shown a further modification of the invention applied to a tilting and swinging seat of the type described wherein a modified inertia latch is pivoted on the cam plate 64 and adapted to engage the seat back hinge arm 74 directly. In this modification a generally C-shaped plate 114 is pivotally mounted on a stud 115 secured on the upper edge of outwardly offset portion 65 of the cam plate 64 directly above the stud 88 carried by the extension 78. Plate 114 is provided with a cut-out center forming a forwardly hooked rear edge 116 and a straight front edge 118 which are adapted to straddle stud 88 when the vehicle is at rest. Since the plate 114 is swingable fore and aft, sudden deceleration of the vehicle will cause the plate to swing forwardly and bring the hooked rear edge 116 into engagement with the stud 88, as shown in Fig. 4, thus prevent any rearward swinging movement of the extension 78 to which the stud 88 is attached. When deceleration has been sufficiently reduced to permit the seat back to settle to the normal position, the hook 116 will disengage the stud 88 and permit the plate 114 to swing rearwardly in response to the force of gravity and resume the position shown in Fig. 3. Since the seat cushion can move forwardly only when the seat back is tilted, it will be seen that by providing an inertia latch acting directly upon the seat back hinge arm, neither forward movement of the cushion nor tilting movement of the seat back is permitted by this modification.

While several embodiments of the invention have been shown and described it will be apparent that other changes and modifications may be made therein by the exercise of skill in the art. It is therefore to be understood that it is not intended to limit the invention to the modifications shown herein.

I claim:

1. In a vehicle, a seat comprising a cushion structure, a track assembly, a tiltable back structure pivotally secured to said cushion structure, said cushion structure being movable along said track assembly in response to tilting of said back structure, and a latch movably mounted on said track assembly, said latch being engageable with said cushion structure to prevent forward movement of said cushion structure and tilting movement of said back structure.

2. In a vehicle seat, a cushion structure supported on a track assembly, a tiltable back structure pivotally secured to said cushion structure, means on said back structure engaging said track assembly whereby said cushion is moved along said track only when said back structure is tilted, and acceleration responsive means on said track assembly for preventing forward movement of said cushion structure, said means normally permitting forward movement of said cushion structure.

3. In a vehicle seat, a cushion structure supported on a track assembly, tiltable back structure pivotally secured to said cushion structure, means on said back structure engaging said track assembly whereby said cushion is moved along said track only when said back structure is tilted, and acceleration responsive means on said track assembly engageable with said back structure to prevent tilting of said seat back, said means normally permitting tilting movement of said back structure.

4. In a vehicle seat, a cushion base member adapted for adjustable positioning along a guide track, a pair of laterally aligned normally upright tiltable back members pivotally mounted on said cushion base member, and a swingable latch mounted on said guide track, said latch normally permitting tiltable movement of said back members and being swingably responsive to deceleration to prevent tilting thereof.

5. In a vehicle seat, a cushion supporting structure adapted for adjustable positioning along a guide track, a pair of laterally aligned normally upright tiltable back members pivotally mounted on said cushion supporting structure, and a swingable latch mounted on said guide track and being adjustable therealong in synchronous relation with said cushion supporting structure, said latch normally permitting tiltable movement of said back members and being swingably responsive to deceleration to prevent tilting thereof.

6. In a vehicle, a seat comprising an adjuster mechanism, a cushion structure including a support member mounted for longitudinal movement along said adjuster mechanism, a tiltable back member pivotally mounted on said support member, and acceleration responsive pendulum means engageable with one of said members in response to deceleration of said vehicle to prevent tilting of said back member.

7. In a vehicle, a seat mechanism comprising a fore and aft adjustable cushion structure, a tiltable back structure pivotally mounted on said cushion structure, said cushion structure and said back structure being operatively interconnected, a swingable latch member pivoted on said mechanism, gravity responsive means for normally aligning said latch, and a projection formed on said cushion structure, said latch being swingable into engagement with said projection in response to deceleration of said vehicle to prevent tilting movement of said back structure.

8. In a vehicle, a seat mechanism comprising a cushion assembly mounted on a movable track, a tiltable back having depending arms pivotally secured on said cushion assembly, means operatively interconnecting said cushion assembly and said back, a projection formed on said cushion assembly, and a pivotally mounted pendulum latch having a projection engaging portion, said pendulum latch being normally aligned by gravity to maintain said portion out of engagement with said projection and being swingably engageable with said projection responsive to deceleration of said vehicle.

9. The structure defined in claim 8 wherein said projection engaging portion comprises a plurality of longitudinally spaced hooks of similar configuration.

References Cited in the file of this patent

UNITED STATES PATENTS

| | | |
|---|---|---|
| 1,956,484 | Bate | Apr. 24, 1934 |
| 2,428,217 | Hedley et al. | Sept. 30, 1947 |
| 2,557,313 | Quilter | June 19, 1951 |
| 2,591,426 | Hadley | Apr. 1, 1952 |
| 2,618,312 | Bradley | Nov. 18, 1952 |

FOREIGN PATENTS

| | | |
|---|---|---|
| 130,814 | Switzerland | Dec. 31, 1928 |